United States Patent [19]

Hagenmaier et al.

[11] Patent Number: 5,276,250
[45] Date of Patent: Jan. 4, 1994

[54] PROCESS FOR DECOMPOSING POLYHALOGENATED COMPOUNDS

[76] Inventors: Hanspaul Hagenmaier, Liegnitzer Str. 8, D-7400 Tübingen; Karl-Heinz Tichaczek, Heldenstr. 21, D-7300 Esslingen; Michael Kraft, Eichenwiesen 6, D-7460 Balingen; Roland Haag, Gustav-Werner-Str. 61, D-7415 Wannweil; Hermann Brunner, Bachgasse 15, D-7400 Tübingen, all of Fed. Rep. of Germany

[21] Appl. No.: 3,953

[22] Filed: Jan. 19, 1993

Related U.S. Application Data

[63] Continuation of Ser. No. 697,735, May 3, 1991, abandoned, which is a continuation of Ser. No. 288,239, Dec. 22, 1988, abandoned, which is a continuation-in-part of Ser. No. 171,429, Feb. 29, 1988, abandoned.

[30] Foreign Application Priority Data

Jul. 11, 1986 [DE] Fed. Rep. of Germany ....... 3623492

[51] Int. Cl.$^5$ .............................................. A63D 3/00
[52] U.S. Cl. ..................... 588/213; 588/209; 588/251; 405/129; 106/DIG. 1
[58] Field of Search ............. 423/245; 208/262.2, 208/262.5; 110/236, 237, 238, 346; 588/208, 205, 213, 248, 251, 256

[56] References Cited

U.S. PATENT DOCUMENTS

| | | | |
|---|---|---|---|
| 3,705,010 | 12/1972 | Davis et al. | 423/502 |
| 3,892,818 | 7/1975 | Scharfe et al. | 260/676 R |
| 3,972,979 | 8/1976 | Kaseyama | 423/240 |
| 3,989,806 | 11/1976 | Hyatt | 423/481 |
| 3,989,807 | 11/1976 | Johnston | 423/502 |
| 4,039,623 | 8/1977 | Lavanish et al. | 423/240 |
| 4,059,675 | 11/1977 | Yang et al. | 423/240 |
| 4,059,676 | 11/1977 | Yang et al. | 423/240 |
| 4,059,677 | 11/1977 | Sare et al. | 423/240 |
| 4,059,683 | 11/1977 | Lindberg et al. | 423/481 |
| 4,065,543 | 12/1977 | Sare et al. | 423/240 |
| 4,151,262 | 8/1979 | Rasp et al. | 423/481 |
| 4,485,081 | 11/1984 | Magistro | 423/481 |
| 4,587,116 | 5/1986 | Livingston | 423/415 A |
| 4,654,203 | 3/1987 | Maurer et al. | 423/240 |
| 4,699,721 | 10/1987 | Meenan et al. | 110/346 |

FOREIGN PATENT DOCUMENTS

| | | | |
|---|---|---|---|
| 3623492 | 1/1988 | Fed. Rep. of Germany | 423/DIG. 20 |
| 2172904 | 10/1973 | France | |
| 2292440 | 6/1976 | France | |

OTHER PUBLICATIONS

Voss et al., Thermal Behavior of PCDD/PCDF in Fly Ash from Municipal Incinerators, Chemosphere, 1986 15 (19-12) pp. 1373-1378, as abstracted in Chem Abstracts vol. 106, 1987 Abstract 106 22610F.

Verbrennung dioxinhaltiger Abfalle aus Seveso May 1986.

Eiceman et al., *Environ. Sci. Technol.*, 16, 53–56, 1982.

Eiceman et al., *Chemosphere*, 11, 6, 569–576, 1982.

*Primary Examiner*—Gary P. Straub
*Attorney, Agent, or Firm*—Bacon & Thomas

[57] ABSTRACT

The invention relates to a process for the decomposition of polyhalogenated aliphatic compounds having 1 to 8 carbon atoms, polyhalogenated cycloalkyl compounds having 5 to 8 carbon atoms and polyhalogenated aromatic compounds having at least 5 carbon atoms. A contaminated substrate or the polychlorinated compounds per se are heated with a suitable catalyst to 150 to 550° C. The process according to the invention is especially suitable for the decomposition of polychlorinated dibenzodioxins and dibenzofurans in soils, scrap loads and waste gases and for decontaminating filter dust from refuse and waste incineration plants.

14 Claims, No Drawings

PROCESS FOR DECOMPOSING POLYHALOGENATED COMPOUNDS

This application is a continuation of application Ser. No. 07/697,735, filed May 3, 1991, now abandoned; which is a continuation of application Ser. No. 07/288,239, filed Dec. 22, 1988, now abandoned; which is a continuation-in-part of application Ser. No. 07/171,429, filed Feb. 29, 1988, now abandoned.

The invention relates to a process for decomposing polyhalogenated compounds, in particular polyhalogenated aliphatic compounds having 1 to 10 carbon atoms, polyhalogenated cycloalkyl compounds having 5 to 8 carbon atoms and polyhalogenated aromatics having at least 5 carbon atoms.

Polyhalogenated cycloalkyl compounds and polyhalogenated aromatic compounds such as polychlorinated dibenzodioxins and polychlorinated biphenyls are highly toxic, teratogenic and carcinogenic compounds. The dioxins especially are almost ubiquitous because they are formed in thermal combustion processes in the presence of a chlorine source, for example in refuse and incineration processes. Since the polyhalogenated compounds are extremely difficult to break down by chemical, thermal and biological means, they are increasingly becoming a problem for the environment, with the risk expecially of harmful consequences in the future.

Hitherto there have been three routes to the decomposition of chlorinated aromatic compounds, especially polychlorinated dibenzodioxins (PCDD) and polychlorinated dibenzofurans (PCDF), namely chemical decomposition of chlorinated aromatic compounds by reaction with sodium or with alcoholates, and thermal or photochemical decomposition of chlorinated aromatic compounds with or without using a catalyst.

Chemical decomposition is, for example, described in EP-A-00 21 294. Here a mass containing halogenated aromatic compounds is made to react with alkali metal alcoholates or with mixtures of alcohols and alkaline reagents such as alkali metal hydroxides and alkali metal carbonates at 140° to 220° C.

Thermal decomposition of PCDD and PCDF has been investigated from the parameters of temperature and residence time. These compounds proved to be thermostable at temperatures below 600° C. and they only begin to be broken down to a significant degree above 800° C. Therefore to ensure the destruction of PCDD and PCDF, and of PCB (polychlorinated biphenyls) temperatures of 1200° to 1400° C. are employed.

Photochemical dehalogenation of brominated and chlorinated compounds is described in U.S. Pat. No. 4,144,152. Here said compounds are irradiated with UV light of 1850 to 4000 Å and treated with hydrogen.

EP-A-0 184 342 describes the decomposition of organic halogen compounds, for example polychlorinated biphenyls, with the help of certain metallic catalysts. The compounds that are to be destroyed must be in gaseous state. The process takes place at a temperature of 450° to 650° C. with strict exclusion of oxygen. An inert carrier gas therefore has to be used, for example a noble gas or highly pure nitrogen, because otherwise there is a risk of chlorinated dioxins or furans forming.

Finally, the heating of fly ash from refuse incineration plants has been reported (Stieglitz and Vogg, 5th International Dioxin Symposium in Bayreuth, September 1985). In these trials the fly ash was heated under an air stream in an open system. It was observed that up to 250° C. there is no change in the concentration of PCDD/PCDF in the fly ash. At 300° C. a tenfold increase in this concentration is observed. Upwards of 400° C. the gradual onset of thermal destruction is described, simultaneously accompanied by partial emission of PCDD/PCDF.

It has so far not been possible to tackle the problem of the decomposition of polychlorinated compound satisfactorily on the basis of the known processes. Either these processes are too inconvenient and costly (chemical decomposition) or they are beset by great problems with technical equipment and are energy intensive (thermal decomposition at 1200°-1400° C.). Moreover it has been shown that despite the high temperatures employed in thermal decomposition there is still not total decomposition of the chorinated aromatics, or reformation by de novo synthesis in cooling zones at temperatures of 180° to 450° C.

The object underlying the invention is therefore to provide a process for decomposing polyhalogenated compounds that is simple and economical and in particular can be carried out at relatively low temperatures, that results in virtually total decomposition of the halogenated aromatics and that allows contaminated substrates of all forms to be treated directly.

Surprisingly it has been found that by using certain metals or derivatives thereof it is possible to achieve rapid and complete decomposition of polyhalogenated compounds at relatively low temperatures.

In one aspect the present invention relates therefore to a process for decomposing polyhalogenated cycloalkyl compounds having 5 to 8 carbon atoms and polyhalogenated aromatics having at least 5 carbon atoms, which comprises heating a solid or liquid substrate contaminated with the polyhalogenated compounds or the polyhalogenated compounds themselves in intimate contact with at least one component selected from the group of metals consisting of Ca, Ba, Zn, Ni, Cu, Fe, Pd, V, W, Mo, Rh or Cr or selected from an oxide, carbonate, silicate or aluminate of said metals, aluminium oxide, ashes and filter dusts from coal combustion plants having a surface area from about 1 to about 45 $m^2/g$, at a temperature in the range of about 150° C. to about 550° C.

In a further aspect the present invention relates to a process for the decomposition of polyhalogenated aliphatic compounds having 1 to 10 carbon atoms, polyhalogenated cylcoalkyl compounds having 5 to 8 carbon atoms and polyhalogenated aromatics having at least 5 carbon atoms which comprises converting into the gaseous state the volatile components present in a solid substrate contaminated with the polyhalogenated compounds or a liquid substrate contaminated with the polyhalogenated compounds or the polyhalogenated compounds themselves by heating or combusting and heating the resulting gases or a gaseous substrate contaminated with the polyhalogenated compounds in intimate contact with at least one component, selected from the group consisting of Ca, Ba, Zn, Ni, Ti, Cu, Fe, Al, Pd, Pt, V, W, Mo, Rh or Cr or an oxide, silicate or aluminate thereof, at a temperature in the range of about 150° C. to about 550° C. in the presence of at least stochiometric amounts of oxygen, relative to the amount of carbon, said component having a surface area of about 1 to about 45 $m^2/g$.

The component which is to be heated together with a polyhalogenated compound or a contaminated substrate may take part in the decomposition reaction or may be regenerated depending on the process conditions (see discussion below). In the following said component is simply called a "catalyst".

The catalysts can be employed in isolation or in admixture. Preferred silicates are zeolithes and montmorillonit. If the catalyst is not employed as a metal, the metal carbonates and oxides are preferred.

The use of iron oxides, natural Ca/Mg carbonates and uncontaminated ashes being quite especially preferred as catalysts for soil decontamination because they do not harm the environment and the decontaminated soils can be reintroduced on the spot.

In accordance with the invention all ashes that contain at least one of the aforementioned catalysts are suitable. Especially suitable ashes include wood ash, which, as is known, contains sodium carbonate, potassium carbonate and calcium carbonate, and coal as, e.g. filter dusts (flue ashes) and bottom ashes from coal-burning plants.

The catalyst has a surface area of less than 50 $m^2/g$ catalyst, preferably about 1 to about 45 $m^2/g$ and especially 10 to 40 $m^2/g$. If the above-mentioned metals are used as a catalyst for the decontamination of a solid or liquid substrate or for the decomposition of the polyhalogenated compounds themselves, the surface area may also be less than 1 $m^2/g$. The surface area can be determined by conventional methods, for example the single-point BET-method (Brunauer, Emmett and Teller).

The polyhalogenated compounds frequently occur as contamination of a solid or liquid substrate. For example soils (earth) may be contaminated with polychlorinated biphenyls, chlorobenzenes, dioxins and dibenzofurans. In addition active carbon is often employed to remove polyhalogenated compounds from gases and liquids, so that contaminated active carbon has to be eliminated or decontaminated. In practice oils too are frequently produced that have been obtained by, for example, the extraction of waste tip seepage water with mineral oils (waste tip seepage water oil) and which are then likewise contaminated with, for example, polychlorinated biphenyls. Moreover polychlorinated biphenyls are produced in large amounts in a highly concentrated form because these compounds continue to be used as transformer oils.

In these cases decontamination can take the form of intimately mixing the contaminated substrates or the highly concentrated polychlorinated compounds with the catalyst, which is in the form of a fine powder, and heating to the temperature indicated above until the desired degree of degradation is reached.

When treating a contaminated solid substrate the weight ratio of catalyst to substrate is generally about 1:30 to 1:1, preferably 1:20 to 1:5. If ash or filter dust (fly ash) is used as the catalyst the weight ratio of ash to contaminated substrate is generally about 1:5 to 2:1, preferably 1:2 to 2:1.

When treating a contaminated liquid substrate or when treating highly concentrated polyhalogenated compounds it is usual to use around 3 to 10 g, preferably 4 to 6 g of catalyst per gram of oil or liquid (this also holds for the use of ash as catalyst). When these proportions are used the mixture of oil or liquid and catalyst is in the form of a powder aggregate. This powder aggregate is easier to handle than the corresponding liquids.

The process may be carried out under conditions of oxygen deficiency (excluding entry of air by working in a closed system or in an inert gas atmosphere) or in the presence of oxygen and, if desired, of water, as described below in greater detail. Under conditions of oxygen deficiency the catalyst is used up in the destruction of polyhalogenated compounds by the formation of metal halides. In fluidized bed operation this may be compensated by continuous renewal of the fluid bed (constant input of catalyst, e.g. ash or metal carbonate, with simultaneous proportional discharge of spent material).

In practice it may be useful not to heat a contaminated solid or liquid substrate or a polyhalogenated compound in a highly concentrated form directly with the catalyst, but convert the volatile components of the solid substrate or liquid into the gaseous state. This can be done in a usual manner by heating, but especially by combusting the liquid substrate or polyhalogenated compound in highly concentrated form. This can be at temperatures of 500° C.–1000° C., possibly with catalyst addition, in the presence of oxygen (which is preferably supplied in the form of air) and water as explained below. Examples of this include driving off the volatile components of a contaminated soil sample, combusting PCB oils and the packing materials for such oils and combusting or decontaminating contaminated active carbon.

The resulting gases containing polyhalogenated compounds, or a contaminated gaseous substrate such as the exhaust gas from a combustion engine powered by waste tip gas (biogases collected from municipal landfills) which owing to the chlorine present in the waste tip gas contains polychlorinated compounds, are then subjected to catalytic decomposition in accordance with the invention. For this the gases are heated in intimate contact with the catalyst. This can preferably be by passing the hot gases over a solid catalyst bed, which is heated if required, or in a fluidized catalyst bed.

It is preferable to use the aforementioned metal oxides or metal carbonates as catalysts.

The heating is done in the presence of at least stochiometric amounts of oxygen, so that oxidizable material will be oxidized, in particular carbon to carbon dioxide.

This is to avoid de novo synthesis of polyhalogenated compounds and the catalysts are predominantly preserved in oxide form.

Additionally, the presence of water helps to avoid said de novo synthesis by stifling chlorine formation. If the halogenated compound contains more hydrogen atoms than halogen atoms the amount of water formed during the oxidative decomposition process is sufficient. However, it is preferred, in particular where more halogen atoms than hydrogen atoms are present, to additionally add water in at least stochiometric amounts relative to the amount of halogen, so that HCl and not chlorine is formed when the polyhalogenated compounds are destroyed.

When highly concentrated polyhalogenated compounds such as PCB oils are combusted the use of catalysts in a fluidized bed has proved to be especially preferred. Very effective catalysts are wood ash or sodium carbonate, potassium carbonate or calcium carbonate, which are the principal constituents of wood ash, as well as natural calcium or magnesium carbonates like dolomite.

The catalysts are generally employed as fine powders with a particle size smaller than 0.1 mm or as pellets or honeycombs. They may be used direct or applied to a substrate (e.g. silicon dioxide, Al₂O₃).

The quantity of catalyst to be used is determined by the product being decontaminated and by the catalyst itself. A person skilled in the art can ascertain the most advantageous quantity of catalyst from within the ranges given above with the help of simple laboratory trials. Unlike in the state of the art, this is possible with the process according to the invention because it can be analytically verified, i.e. the extent of decomposition can be ascertained by analysing the substrate/catalyst mixture for its content of halogenated aromatics. It will be readily understood that an analytical determination in the high-temperature processes of the state of the art is not possible during combustion.

The above processes can be carried out within a broad temperature range depending on the catalyst being used and the residence time. In certain cases just 150° C. is sufficient to achieve more than 99% decomposition of the halogenated aromatics. In general, a temperature range of 150°-550° C. is adopted, preferably 200°-550° C. Temperatures of 300°-500° C., but also 200°-400° C., and especially 300°-450° C., and most preferably 300°-400° C. have proved to be particularly suitable. In general there is sufficiently rapid and complete decomposition of the polyhalogenated compounds at around 350° C., i.e. at a detection limit of 0.01-0.1 ng/g, depending on the substrate concerned, no polyhalogenated compounds can be detected. This temperature has therefore proved to be especially effective in practice.

As already mentioned, the degree of temperature determines the length of treatment with the catalyst. At low temperatures heating has to be for a longer period, while at higher temperatures there is almost instant decomposition of the halogen compounds. In order for complete decomposition of polychlorinated compounds to be achieved in each case, the duration of the reaction at 150° C., for example, is 1 to 3 hours. At just 350° C. this time is less than one minute, while at 550° C. decomposition takes just a few seconds.

To carry out the processes of the invention the polyhalogenated compounds are mixed with the catalyst by standard techniques, e.g. pulverization or applying a solution of the polyhalogenated compounds to the catalyst and evaporating the solvent if required. This is followed by heating to the desired temperature until the desired degree of decomposition has been reached.

The process according to the invention can be carried out in an open or closed system, optionally in an inert gas atmosphere, in standard equipment. However, given the known toxicity of the polyhalogenated compounds a closed system is to be preferred.

According to current knowledge the decomposition of halogenated aromatics using the process of the invention is by two different routes: The catalysts effect dehalogenation on the one hand and breakdown of the aromatic complex on the other, both routes often even being followed simultaneously.

One environmental problem that is as yet unsolved is filter dust (fly ash) produced in municipal refuse incineration plants, but also in many industrial waste incineration plants. Since this fly ash contains heavy metals, but in particular also contains polyhalogenated compounds, especially polychlorinated dibenzodioxins and dibenzofurans, the fly ash has to be separated in suitable separation devices, e.g. in cyclone extractors, electrostatic filters or similar dust extractors.

Now it has been found that the polyhalogenated compounds present in fly ashes from refuse and waste incineration plants can be destroyed by directly heating the fly ash at a temperature between 150°-550° C., preferably 200°-500° C., and most preferably 300°-450° C. In general there is sufficiently rapid and complete decomposition of the polyhalogenated compounds at around 350° C., i.e. at a detection limit of 0.01-0.1 ng/g, no polyhalogenated compounds can be detected. This temperature has therefore proved to be especially effective in practice. Here it is essential that heating takes place in a non-throughflow system in conditions of oxygen deficiency attained by excluding entry of air by working in a closed system or in an inert gas atmosphere.

If air is prevented from entering the oxygen deficiency conditions will be initiated automatically. This step is of crucial importance, since if oxygen is constantly in excess supply (conditions of oxygen surplus) there will be reforming of polychlorinated dibenzodioxins and dibenzofurans. It is in principle also possible to work in a throughflow system under inert gas (for example nitrogen). The drawback of this procedure is that the inert gas has to be heated up and there is partial emission of the polyhalogenated compounds in the througflow system even at 300° C.

Since fly ash from refuse and waste incineration plants per se contains at least one of the above catalysts as an oxide, carbonate or salt, fly ash as such (free of polyhalogenated compounds) can also be employed as a catalyst in the process according to the invention. Fly ashes from refuse and waste incineration plants generally reveal the following analytical data:

| | |
|---|---|
| water soluble proportion | 8-15% |
| pH | 9-12 |
| Aluminium | $(50-120) \cdot 10^3$ mg/kg |
| Barium | 4000-7000 mg/kg |
| Lead | 4000-7000 mg/kg |
| Calcium | $(80-100) \cdot 10^3$ mg/kg |
| Chromium | 500-3000 mg/kg |
| Cadmium | 100-500 mg/kg |
| Iron | $(20-50) \cdot 10^3$ mg/kg |
| Potassium | $(30-45) \cdot 10^3$ mg/kg |
| Copper | 500-4000 mg/kg |
| Magnesium | $(10-20) \cdot 10^3$ mg/kg |
| Manganese | 1000-1600 mg/kg |
| Sodium | $(10-30) \cdot 10^3$ mg/kg |
| Nickel | 100-1500 mg/kg |
| Titanium | 7000-10 000 mg/kg |
| Zinc | $(10-40) \cdot 10^3$ mg/kg |
| SiO₂ | $(250-500) \cdot 10^3$ mg/kg |

Fly ashes that deviate in one or more of the above values are, however, also suitable for use in the process according to the invention, the essential condition being that the fly ash should contain at least one of the above catalysts.

Fly ashes are generally employed just as they come from the incineration plants.

As already mentioned, the degree of temperature determines the length of treatment of the fly ash. At low temperatures heating has to be for a longer period, while at higher temperatures there is almost instant decomposition of the halogen compounds.

The term "polyhalogenated" also includes monohalogenated compounds.

Using the processes of the invention polyhalogenated aliphatic, cycloalkyl and aromatic compounds that are difficult to decompose, especially chlorinated and brominated aromatics, can be decomposed simply and quickly. "Aromatics" here in particular means benzene, alkylbenzenes, naphthalene, alkylnaphthalene, biphenyl, diphenyl ether and most especially dibenzodioxins and dibenzofurans. Examples of such compounds are hexachlorocyclohexane, polychlorinated dibenzodioxins, polychlorinated dibenzofurans, polychlorinated biphenyls, chlorobenzenes, chlorophenols and polychlorinated naphthalenes, as well as the corresponding polybrominated and combination chlorine/bromine substituted compounds. Examples of polyhalogenated aliphatic compounds are dichloromethan, carbontetrachloride, vinyl chloride, perchloroethylene, hexachlorobutadiene and the like. The process according to the invention has proved to be of particular use for the decontamination of soils and fly ashes containing polyhalogenated compounds, as well as for the decontamination of oils by the addition of fly ash containing catalyst or other catalysts and for cleaning exhaust gases.

The examples that follow will illustrate the invention. The polyhalogenated compounds were determined using gas chromatography/mass spectrometry on Silar 10C quartz capillary columns.

In each case the catalyst were used in the form of fine powder or as pellets.

Untreated and treated samples were analyzed for halogenated compounds as described in example 12 in connection with fly ash.

EXAMPLE 1

400 µg octachlorodibenzodioxin (OCDD) and octachlorodibenzofuran (OCDF) respectively were added to 1 g fly ash [1] containing catalyst and heated to 280° C. in a sealed glass tube. After 15 min 99% of the OCDD and OCDF respectively had been decomposed into lower chlorinated products. 70% of the OCDD was identified as di to heptachlorodibenzodioxins. After 2 hrs at 300° C. 99% of the chlorinated aromatics had all been decomposed.

[1] recovered from a municipal refuse incineration plant and used without being further treated The polyhalogenated compound was applied to the catalyst in this case and also in Examples 2-6 and 8 as follows: 5 g of the catalyst were suspended in approx. 20 ml hexane and the quantity of polyhalogenated compound (or a solution thereof in benzene) corresponding to the desired charge was added. The solvent was then drawn off on a rotary evaporator, followed by blasting dry with nitrogen.

EXAMPLE 2

OCDD was dechlorinated with copper (18.23 µg OCDD/g Cu) at various temperatures in a sealed glass tube. The results are summarized in Table 1 below, which also indicates the concentrations of lower chlorinated dioxins occurring as intermediates. The values are calculated as a percentage of the OCDD concentration used. The values of the lower chlorinated dioxins take into account the respective mass correction factor.

TABLE 1

| Minutes | 150° C. | | | | 180° C. | | | 210° C. | | | 250° C. | | | 285° C. | | |
|---|---|---|---|---|---|---|---|---|---|---|---|---|---|---|---|---|
| | 1 | 5 | 30 | 120 | 1 | 5 | 30 | 1 | 5 | 30 | 1 | 5 | 30 | 1 | 2 | 5 |
| TetraCDD | <0,01 | <0,01 | 0,57 | 2,4 | <0,01 | 0,65 | 0,07 | 0,02 | 0,38 | 0,12 | 1,15 | 0,12 | <0,01 | 1,31 | 0,03 | <0,01 |
| PentaCDD | <0,01 | 0,05 | 10,68 | 0,6 | <0,01 | 5,56 | 0,04 | 0,38 | 0,16 | 0,09 | 2,35 | 0,07 | <0,01 | 0,63 | 0,01 | <0,01 |
| HexaCDD | <0,01 | 1,03 | 13,22 | 0,1 | <0,01 | 13,31 | 0,04 | 1,59 | 0,26 | 0,03 | 4,89 | 0,01 | <0,01 | 0,18 | 0,01 | <0,01 |
| HeptaCDD | 2,5 | 13,15 | 14,34 | 0,1 | 4,6 | 16,93 | 0,04 | 6,65 | 0,15 | 0,02 | 15,13 | <0,01 | <0,01 | 0,16 | 0,01 | <0,01 |
| OctaCDD | 105,5 | 82,97 | 4,68 | 0,1 | 76,3 | 5,0 | 0,04 | 60,65 | 0,12 | 0,02 | 45,40 | 0,03 | 0,02 | 0,19 | 0,01 | <0,01 |
| Total | 108,0 | 97,20 | 43,49 | 3,3 | 80,9 | 41,45 | 0,23 | 69,29 | 1,07 | 0,28 | 68,92 | 0,23 | 0,02 | 2,47 | 0,07 | <0,01 |

EXAMPLE 3

Dechlorination of OCDF using the catalytic action of copper (14.73 µg OCDF/g Cu) was investigated at 150°-285° C. in a sealed glass tube. The results are summarized in Table 2 below, the values being calculated as a percentage of the OCDF concentration used. The values of the lower chlorinated furans, likewise given in the Table, take into account the respective mass correction factor.

TABLE 2

| Minutes | 150° C. | | | | 180° C. | | | 210° C. | | | 250° C. | | | 285° C. | | |
|---|---|---|---|---|---|---|---|---|---|---|---|---|---|---|---|---|
| | 1 | 5 | 30 | 120 | 1 | 5 | 30 | 1 | 5 | 30 | 1 | 5 | 30 | 1 | 2 | 5 |
| Tetra-CDF | <0,01 | <0,01 | 1,47 | 4,5 | <0,01 | 3,26 | 0,13 | 0,06 | 0,70 | 0,29 | 2,20 | 0,32 | <0,01 | 9,70 | 2,10 | 0,02 |
| Penta-CDF | <0,01 | 0,20 | 18,81 | 2,9 | <0,01 | 27,68 | 0,14 | 1,01 | 0,23 | 0,26 | 9,92 | 0,06 | <0,01 | 4,10 | 0,89 | <0,01 |
| Hexa-CDF | <0,01 | 5,00 | 23,03 | 0,14 | 0,62 | 28,96 | 0,05 | 3,42 | 0,04 | 0,10 | 23,18 | 0,02 | <0,01 | 0,62 | 0,15 | <0,01 |
| Hepta-CDF | 0,96 | 39,30 | 9,67 | 0,07 | 10,4 | 10,90 | 0,02 | 14,30 | <0,01 | <0,01 | 53,29 | 0,01 | <0,01 | 0,24 | 0,06 | <0,01 |
| Octa-CDF | 95,59 | 36,30 | 0,43 | <0,01 | 77,2 | 0,29 | <0,01 | 67,29 | <0,01 | <0,01 | 16,31 | 0,01 | <0,01 | 0,08 | 0,01 | <0,01 |
| Total | 96,55 | 80,80 | 53,41 | 7,61 | 88,22 | 71,09 | 0,34 | 86,08 | 0,97 | 0,65 | 104,90 | 0,42 | <0,01 | 14,74 | 3,21 | 0,02 |

EXAMPLE 4

The destruction of OCDD at 250° C. and a residence time of 30 min was investigated using various catalysts. For this 20 µg OCDD was added to 1 g of each of the corresponding metal and metal oxide respectively and this was heated in a sealed glass tube. The catalysts used were Zn, Ni, Cu, Fe, Al, Pt, Rh, ZnO, NiO, $Cr_2O_3$, $Fe_2O_3$, $Fe_3O_4$ and $Al_2O_3$. The results are summarized in Table 3 below.

TABLE 3

| Metal | % Decomposition | Metal Oxide | % Decomposition |
|---|---|---|---|
| Zn | 99.86 | ZnO | 99.3 |
| Ni | 98.6 | NiO | >99.99 |
| Cr | 96.4 | $Cr_2O_3$ | 97.3 |
| Cu | 99.95 | CuO | >99.99 |
| Fe | 99.97 | $Fe_2O_3$ | 58.6 |
| | | $Fe_3O_4$ | 89.3 |
| Al | 98.4 | | |

TABLE 3-continued

| Metal | % Decomposition | Metal Oxide | % Decomposition |
|---|---|---|---|
| Pt* | 99.8 | | |
| Rh** | 99.6 | | |

*For Pt 1 g of 5% platinized asbestos was used.
**For Rh 5% rhodium on aluminium oxide was used.

In the experiments with Cu, Pt, Rh and Al even lower chlorinated dibenzodioxins were able to be detected as intermediates.

EXAMPLE 5

The experiments described in Example 4 were repeated at 300° C. and a residence time of 15 min. Once experimentation was finished OCDD could not be detected in any of the runs (decomposition degree>99.9%).

EXAMPLE 6

The experiment described in Example 5 was repeated with a PCDD/PCDF mixture. To obtain this mixture fly ash from refuse incineration plants was treated with dilute hydrochloric acid, the undissolved components were isolated, dried in air and extracted with toluene in a Soxhlet extractor.

The degree of decomposition for all PCDD/PCDF isomers was in all cases>99% with a detection limit of 0.01% for each individual isomer. As in the experiments under Examples 4 and 5, no 2,3,7,8-TCDD could be detected here either.

EXAMPLE 7

1 g of a soil sample from a contaminated 2,4,5-trichlorophenol production area of a chemical factory, containing 100 ppb 2,3,7,8-TCDD was admixed with the quantity of metal or metal oxide or fly ash[1] indicated in the following Table (by shaking the air-dried soil sample with the catalyst) and treated as indicated in Table 4. The following results were obtained:
[1] containining catalyst

TABLE 4

| Catalyst | Temperature (°C.) | Residence Time (min) | % Decomposition 2,3,7,8-TCDD |
|---|---|---|---|
| 0.2 g Cu | 250 | 40 | 79.4 |
| 0.2 g Cu | 300 | 30 | 95.2 |
| 0.2 g Cu | 300 | 60 | 96.4 |
| 0.2 g Cu | 350 | 30 | 99.0 |
| 0.2 g Cu | 350 | 60 | >99.9 |
| 0.2 g NiO | 300 | 60 | 99.7 |
| 0.2 g NiO | 350 | 30 | 99.85 |
| 0.2 g NiO | 350 | 120 | >99.9 |
| 0.2 g Fe$_2$O$_3$ | 350 | 120 | >99.9 |
| 0.2 g Fe$_3$O$_4$ | 350 | 120 | >99.9 |
| 1 g fly ash[1] | 350 | 120 | >99.9 |

EXAMPLE 8

In a ratio of 200 μg/g catalyst, hexachlorobenzene was heated on the one hand with copper and on the other with nickel oxide, in each case for 30 mins to 250° C. When copper was used 100% of the hexachlorobenzene was decomposed, when nickel oxide (NiO) was used decomposition was 99.5% complete.

The same experiment was repeated with polychlorinated biphenylene, using 1 mg Clophen A30 and 1 mg Clophen A60 respectively (a mixture of chlorinated biphenyls) per 1 g of catalyst. The results obtained were as follows:

| Catalyst | Degree of Decomposition A30 | A60 |
|---|---|---|
| Cu | 95% | 100% |
| NiO | 93% | 90% |

EXAMPLE 9

1 g of seepage water oil from a special waste dump, containing 50 ppb 2,3,7,8-TCDD, was admixed with 5 g of fly ash containing catalyst (shaking produced a free-flowing mass) and heated for 2 hours at 350° C. in a closed vessel. 2,3,7,8-TCDD could no longer be detected at a detection limit of 0.1 ng/g, calculated on 1 g of oil. Nor could the PCDD/PCDF originally present in the fly ash now be detected at a detection limit of 0.02 mg/g, calculated on 5 g of fly ash.

EXAMPLE 10

The decomposition of PCDD/PCDF in fly ashes from various domestic refuse incineration plants was pursued by treatment for two hours at 280° C. and 300° C. respectively in a sealed glass tube. The results are summarized in Table 5 below and contrasted with those for untreated fly ash (untr.) The content of chlorinated compounds is indicated in ng/g.

TABLE 5

| | Fly Ash | | | | | | | | | | | | | |
|---|---|---|---|---|---|---|---|---|---|---|---|---|---|---|
| | A | | B | | C | | D | | E | | F | | G | |
| | untr.[1] | 280° C. | untr. | 280° C. | untr. | 280° C. | untr. | 300° C. | untr. | 300° C. | untr. | 300° C. | untr. | 300° C. |
| 2,3,7,8-TCDD | 0,5 | 0,9 | 2,0 | 3,2 | 0,6 | 1,6 | 0,34 | 0,04 | 0,03 | <0,01 | 0,21 | 0,01 | 0,12 | <0,01 |
| Total TetraCDD | 24 | 21 | 24 | 59 | 12 | 30 | 3,8 | 1,2 | 0,6 | n.n.[2] | 7,5 | 0,19 | 5,2 | 1,1 |
| Total PentaCDD | 116 | 19 | 116 | 88 | 59 | 29 | 8,2 | 1,1 | 1,2 | n.n. | 13,2 | 0,25 | 11,4 | n.n. |
| Total HexaCDD | 185 | 6 | 233 | 50 | 110 | 18 | 14,6 | 1,1 | 1,4 | n.n. | 15,8 | 0,10 | 15,0 | n.n. |
| Total HeptaCDD | 159 | 2 | 1067 | 22 | 200 | 15 | 20,7 | 1,2 | 1,8 | n.n. | 12,4 | 0,10 | 25,6 | n.n. |
| OctaCDD | 88 | 1 | 6204 | 11 | 458 | 13 | 11,8 | 0,8 | 1,9 | n.n. | 14,5 | 0,07 | 23,1 | n.n. |
| Total PCDD | 572 | 49 | 7644 | 230 | 839 | 105 | 59,1 | 5,4 | 6,9 | — | 63,4 | 0,71 | 80,3 | 1,1 |
| Total TetraCDF | 111 | 14 | 139 | 41 | 62 | 38 | 32,1 | 0,5 | 9,0 | n.n. | 28,7 | 0,15 | 22,4 | 10,1 |
| Total PentaCDF | 188 | 12 | 393 | 69 | 250 | 41 | 38,3 | 0,5 | 10,2 | n.n. | 32,5 | 0,14 | 24,2 | n.n. |
| Total HexaCDF | 123 | 4 | 415 | 34 | 377 | 30 | 31,7 | 0,4 | 8,0 | n.n. | 24,6 | 0,11 | 19,0 | n.n. |
| Total HeptaCDF | 35 | 1 | 844 | 9 | 292 | 16 | 15,9 | 0,3 | 3,4 | n.n. | 12,8 | 0,07 | 11,1 | n.n. |
| OctaCDF | 26 | n.n. | 1368 | 4 | 400 | 7 | 1,5 | <0,04 | 0,7 | n.n. | 4,6 | <0,04 | 2,1 | n.n. |
| Total PCDF | 483 | 31 | 3159 | 157 | 1381 | 132 | 119,5 | 1,7 | 31,3 | — | 103,2 | 0,47 | 78,8 | 10,1 |

[1] untreated
[2] n.n. = not detectable

Fly ashes A, B and C had the following composition:

| Metallic Content g/kg | Fly Ash | | |
|---|---|---|---|
| | A | B | C |
| Cr | 2.2 | 0.3 | 0.3 |
| Pb | 39.2 | 6.9 | 5.4 |
| Cd | 0.18 | 0.46 | 0.24 |
| Ni | 0.16 | 0.19 | 0.57 |
| Cu | 0.8 | 3.1 | 3.4 |
| Zn | 14.7 | 31.4 | 20.1 |
| Fe | 46.6 | 43.4 | 48.7 |

EXAMPLE 11

In the experiments that follow the decomposition of hexachlorobenzene and octachlorodibenzodioxin was investigated. For this purpose 5 g of each of the catalysts were suspended in approx. 20 ml hexane and 100 µl of a starting solution were added in each case. The starting solution used was a solution of hexachorobenzene (HCB) in benzene (2 mg/ml) and octachlorodibenzodioxin (OCDD) in benzene (1 mg/ml). The solvent was then slowly drawn off on a rotary evaporator to ensure good adsorption. The mixture was then blasted dry with nitrogen.

0.5 g portions of the mixture were put into ampoules, which were then sealed. This was followed by thermal treatment at the respective temperature and time indicated. After cooling the ampoules were broken open, the contents were transferred to a round-bottomed flask and washed out with 2×5 ml toluene. A further 15 ml toluene was then added and the samples were refluxed for 20 min. The samples were then injected hot into the GC/ECD.

A blank was run for comparison (extraction of the untreated mixture). The values given refer to the respective blank runs. The results are summarized in Tables 6 and 7 below.

Table 6

Catalyst: Ashes from coal-burnign plants, wood ash, metal carbonates
Thermal treatment: Ashes: 350° C., 30 min.
Carbonate: 350° C., 5 min.

| Sample | Decomposition in % of the Starting Value | |
|---|---|---|
| | HCB | OCDD |
| A 1 | 60.7 | 79.8 |
| A 2 | 65.5 | 76.5 |
| A 3 | 99.0 | 99.2 |
| A 4 | 99.4 | 99.5 |
| A 5 | 98.1 | 98.7 |
| A 6 | 99.7 | 99.3 |
| A 7 | 99.5 | 98.5 |
| A 8 | 99.8 | >99.9~ |
| A 9 | 86.0 | 84.0 |
| $K_2CO_3$ | 40.0 | 98.7 |
| $Na_2CO_3$ | 38.1 | >99.9~ |
| $CaCO_3$ | 99.7 | >99.9~ |

A 1: Coal-fired power station fly ash, Plant A
A 2: Coal-fired power station fly ash, Plant B
A 3: Smelting cyclone coal-fired station fly ash, Sample 1
A 4: Smelting cyclone coal-fired station fly ash, Sample 2
A 5: Smelting cyclone coal-fired station fly ash, Sample 3
A 6: Cyclone ash from fluidized waste solids combustion with oil shale, Sample 1
A 7: Cyclone ash from fluidized waste solids combustion with oil shale, Sample 2
A 8: Wood ash from open chimney
A 9: Bottom ash/fly ash from fluidized waste solids combustion with refuse coal

TABLE 7

Catalyst: Metal oxides (surface area: 5-10 $m^2/g$)
Thermal treatment: 300° C., 5 min.

| Sample | Decomposition in % of the Starting Value OCDD |
|---|---|
| $CrO_3$ | 94.8 |
| $MoO_3$ | 91.4 |
| $WO_3$ | 93.5 |
| $TiO_2$ | 94.4 |
| $V_2O_5$ | 94.4 |

EXAMPLE 12

Fly ash from a municipal refuse incinerating plant was heated in a closed apparatus. The apparatus consisted of a heatable, horizontally arranged pipe with a rotating paddle shaft to move the fly ash on. The fly ash was input and discharged under conditions of oxygen deficiency with the help of a suitable pushing arrangement. Throughput was approx. 60 kg/h. The fly ash used contained polychlorinated dibenzodioxins and dibenzofurans. To analyse the untreated and thermally treated fly ashes, respectively, the following procedure was adopted: 1N HCl was added to each 25 g portion of fly ashes and stirred for 30 min. Next the samples were filtered off, washed with water and dried for 24 h in air. Each of the samples was transferred into fibre-glass extraction shells, doped with 200 µl of a $^{13}C$ standard PCDD/PCDF mixture*, overlayered with anhydrous sodium sulphate and extracted for 24 h with toluene in a Soxhlet apparatus. The toluene extract was concentrated to about 5 ml controlled by vacuum.

*10 ng $^{13}C_{12}$-2,3,7,8-TCDD, $^{13}C_{12}$-2,3,7,8-TCDF, $^{13}C_{12}$-1,2,3,7,8-PeCDD, $^{13}C_{12}$-1,2,3,7,8-PeCDF, $^{13}C_{12}$-1,2,3,6,7,8-HexCDD, $^{13}C_{12}$-1,2,3,4,7,8-HexCDF, plus 20 ng each of $^{13}C_{12}$-1,2,3,4,6,7,8-HepCDD, $^{13}C_{12}$-1,2,3,4,6,7,8-HepCDF, $^{13}C_{12}$-OctaCDD and $^{13}C_{12}$-OctaCDF.

The concentrated toluene extract was put onto a column—filled with 25 g basic aluminium oxide, activity grade Super I, and overlayered with 20 g sodium sulphate. This was followed by washing again with 100 ml benzene and then with 200 ml hexane/dichloromethane (98:2). Next the PCDD/PCDF were eluted with 200 ml hexane/dichloromethane (1:1).

This fraction was concentrated to approx. 30 µl. The resulting samples were analysed by means of GS/MS.

The results are summarized in Table 8 below.

TABLE 8

Determination of polychlorinated dibenzodioxins and dibenzofurans as the sum of the various degrees of chlorination
Nature of sample: Fly ash, all quantities given in ng/g

| | ½ b, | | 1 b, | |
|---|---|---|---|---|
| | untr. | 400° C. | untr. | 400° C. |
| TetraCDD | 19.8 | 4.18 | 42.1 | n.n. *) |
| PentaCDD | 78.0 | 5.86 | 93.5 | n.n. |
| BexaCDD | 152.1 | 4.87 | 129.8 | n.n. |
| BeptaCDD | 112.3 | 4.13 | 75.5 | n.n. |
| OctaCDD | 87.4 | 1.98 | 73.4 | 0.30 |
| Total PCDD | 449.6 | 21.02 | 414.3 | 0.30 |
| TetraCDF | 111.8 | 8.44 | 236.5 | 0.67 |
| PentaCDF | 113.6 | 5.53 | 205.2 | n.n. |
| BexaCDF | 75.3 | 2.55 | 87.3 | n.n. |
| BeptaCDF | 38.3 | 1.57 | 43.5 | n.n. |
| OctaCDF | 10.9 | 0.81 | 9.2 | n.n. |
| Total PCDF | 349.9 | 18.90 | 581.7 | 0.67 |

The detection limit per individual component was at 0.01 ng/g.
*) n.n. = not detectable In the following examples the decomposition of tetrachloroethane ($C_2Cl_4$), hexachlorbenzene (HCB) and 2,4,8-trichlorodibenzofurane ($Cl_3DF$) on various oxidation catalysts in a flow through system.

Before and after the catalyst bed samples of gas could be aspirated which were passed over highly active cartridges of carbon (5 mg active carbon) to adsorb HCB and 2,4,8-triCDF. The active carbon cartridges were eluted with $CS_2$ and the eluate was examined for starting and decomposition products by means of GC/FID and GC/ECD respectively. In addition the post-catalyst gas stream was continually analysed for $Cl_2$ and $Cl^-$. Perchloroethylene was analyzed gaschromatographically.

Formation of polychlorinated dibenzodioxins and dibenzofurans could not be observed in any experiment.

Conditions:
Concentration of $C_2Cl_4$: 1000 ppm; of HCB: 10 ppm; of $Cl_3DF$: 10 ppm.
Carrier Gas: Air+$H_2O$ (10:2 v/v at 400° C.)

EXAMPLE 13

Catalyst: CoO supported on alumina
Surface area: 7 m²/g
Space velocity ($h^{-1}$): 1000
Measured after at least 300 hours of continuous operation
Decomposition given in %

| Temp. in °C. (entrance of catalyst) | 350 | 400 | 450 | 500 |
|---|---|---|---|---|
| $C_2Cl_4$ | 80 | 92 | 99 | >99.9 |
| HCB | 98 | 99.5 | 99.95 | >99.99 |
| $Cl_3DF$ | 99 | >99.99 | >99.99 | >99.99 |

EXAMPLE 14

Catalyst: CuO/$Cr_2O_3$ supported on alumina
Surface area: 33 m²/g
Space velocity ($h^{-1}$): 1000
Measured after at least 300 hours of continuous operation
Decomposition given in %

| Temp. in °C. (entrance of catalyst) | 350 | 400 | 450 | 500 |
|---|---|---|---|---|
| $C_2Cl_4$ | 90 | 98 | 99.9 | >99.9 |
| HCB | 95 | 98.9 | >99.99 | >99.99 |
| $Cl_3DF$ | 97 | >99.99 | >99.99 | >99.99 |

EXAMPLE 15

Catalyst: $Fe_2O_3$ supported on alumina
Surface area: 10 m²/g
Space velocity ($h^{-1}$): 1000
Measured after at least 300 hours of continuous operation
Decomposition given in %

| Temp. in °C. (entrance of catalyst) | 350 | 400 | 450 | 500 |
|---|---|---|---|---|
| $C_2Cl_4$ | 92 | 97 | 99.9 | >99.9 |
| HCB | 96 | 99.7 | 99.92 | >99.99 |
| $Cl_3DF$ | 98 | >99.99 | >99.99 | >99.99 |

EXAMPLE 16

Catalyst: $MoO_3$/CoO supported on alumina
Surface area: 40 m²/g
Space velocity ($h^{-1}$): 1000
Measured after at least 300 hours of continuous operation
Decomposition given in %

| Temp. in °C. (entrance of catalyst) | 350 | 400 | 450 | 500 |
|---|---|---|---|---|
| $C_2Cl_4$ | 85 | 91 | 99.1 | >99.9 |
| HCB | 82 | 96 | 99.4 | 99.93 |
| $Cl_3DF$ | 94 | 99.2 | >99.99 | >99.99 |

EXAMPLE 17

Catalyst: CuO/$Cr_2O_3$ supported on silica
Surface area: 35 m²/g
Space velocity ($h^{-1}$): 1000
Measured after at least 300 hours of continuous operation
Decomposition given in %

| Temp. in °C. (entrance of catalyst) | 350 | 400 | 450 | 500 |
|---|---|---|---|---|
| $C_2Cl_4$ | 68 | 87 | 98.3 | >99.9 |
| HCB | 78 | 95 | 99.9 | >99.99 |
| $Cl_3DF$ | 96 | 98 | >99.99 | >99.99 |

EXAMPLE 18

Catalyst: NiO supported on zeolithe
Surface area: 40 m²/g
Space velocity ($h^{-1}$): 1000
Measured after at least 300 hours of continuous operation
Decomposition given in %

| Temp. in °C. (entrance of catalyst) | 350 | 400 | 450 | 500 |
|---|---|---|---|---|
| $C_2Cl_4$ | 91 | 98 | 99.9 | >99.9 |
| HCB | 94 | 98 | >99.99 | >99.99 |
| $Cl_3DF$ | 99 | >99.99 | >99.99 | >99.99 |

EXAMPLE 19

Catalyst: Pt/Rh supported on alumina, monolythic (honey comb)
Surface area: 40 m²/g
Space velocity ($h^{-1}$): 1000
Measured after at least 300 hours of continuous operation
Decomposition given in %

| Temp. in °C. (entrance of catalyst) | 350 | 400 | 450 | 500 |
|---|---|---|---|---|
| $C_2Cl_4$ | 78 | 85 | 98 | 99.2 |
| HCB | 98 | 99.3 | >99.99 | >99.99 |
| $Cl_3DF$ | 99 | >99.99 | >99.99 | >99.99 |

We claim:

1. The process for the decomposition of polyhalogenated aromatic compounds having at least 5 carbon atoms and being present in fly ash from refuse and waste incineration plants which comprises heating filter dust that is contaminated with the polyhalogenated aromatics directly in a non-throughflow system in conditions of oxygen deficiency, at a temperature between 150° C. and 550° C.

2. The process according to claim 1, wherein the heating temperature is in the range of about 300° C. to 450° C.

3. The process according to claim 1, wherein filter dust from separator devices of refuse and waste incineration plants is used.

4. The process according to claim 1, wherein the heating is effected in an inert gas atmosphere.

5. The process according to claim 1, wherein the heating is effected under the exclusion of air.

6. The process according to claim 1, wherein the polyhalogenated aromatics contain more than 10 carbon atoms.

7. The process according to claim 1, wherein the polyhalogenated compound is selected from the group consisting of polychlorinated dibenzodioxins, polychlorinated dibenzofurans, chlorobenzens, polychlorinated biphenyls, chlorophenols and hexachlorocyclohexane.

8. The process for the decomposition of polyhalogenated aromatic compounds having at least 5 carbon atoms and being present in fly ash from refuse and waste incineration plants which comprises heating filter dust that is contaminated with the polyhalogenated aromatics directly in a closed non-throughflow system in conditions of oxygen deficiency, at a temperature between 150° C. and 550° C.

9. The process according to claim 8, wherein the heating temperature is in the range of about 300° C. to 450° C.

10. The process according to claim 8, wherein filter dust from separator devices of refuse and waste incineration plants is used.

11. The process according to claim 8, wherein the heating is effected in an inert gas atmosphere.

12. The process according to claim 8, wherein the heat is effected under the exclusion of air.

13. The process according to claim 8, wherein the polyhalogenated aromatics contain more than 10 carbon atoms.

14. The process according to claim 8, wherein the polyhalogenated compound is selected from the group consisting of polychlorinated dibenzodioxins, polychlorinated dibenzofurans, chlorobenzens, polychlorinated biphenyls, chlorophenols and hexachlorocyclohexane.

* * * * *